(12) United States Patent
Tanner et al.

(10) Patent No.: US 8,065,660 B1
(45) Date of Patent: Nov. 22, 2011

(54) METHOD AND SYSTEM FOR RUN-TIME CUSTOMIZATION OF NETWORK MANAGEMENT APPLICATIONS

(75) Inventors: David Anthony Tanner, Saratoga, CA (US); Lei Yuan, Nepean (CA); Michael L. Schuett, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1284 days.

(21) Appl. No.: 11/505,154

(22) Filed: Aug. 15, 2006

Related U.S. Application Data

(60) Provisional application No. 60/799,928, filed on May 12, 2006.

(51) Int. Cl.
*G06F 9/44* (2006.01)
(52) U.S. Cl. ........ 717/121; 717/104; 717/110; 717/115; 719/320; 709/223
(58) Field of Classification Search .................. None
See application file for complete search history.

(56) References Cited

U.S. PATENT DOCUMENTS

| | | | |
|---|---|---|---|
| 6,625,590 B1* | 9/2003 | Chen et al. ..................... | 709/223 |
| 7,484,223 B2* | 1/2009 | Hill et al. ..................... | 719/320 |
| 7,526,771 B2* | 4/2009 | Roman et al. ................. | 719/316 |
| 7,555,743 B2* | 6/2009 | Sridhar et al. ................ | 717/106 |
| 7,607,126 B2* | 10/2009 | Read ............................. | 717/172 |
| 7,721,259 B2* | 5/2010 | Heinke et al. ................. | 717/121 |
| 2006/0036721 A1* | 2/2006 | Zhao et al. .................... | 709/223 |

OTHER PUBLICATIONS

Raouf Boutaba and Jin Xiao; Network Management: State of the Art, Proceedings of the IFIP 17th World Computer Congress—TC6 Stream on Communication Systems: the State of the Art, pp. 127-146, Aug. 25-30, 2002, 21 pages found at: http://bcr2.uwaterloo.ca/~rboutaba/Papers/Invited/WCC-02.pdf.

* cited by examiner

*Primary Examiner* — Michael J Yigdall
(74) *Attorney, Agent, or Firm* — Fish & Richardson P.C.

(57) ABSTRACT

A method and an application-building tool for creating and customizing a network management application in a network defined by a plurality of network elements are provided. The customization of the network management application includes providing a customized definition file Further, the customized definition file is associated with the network management application at run time. Thereafter, the network management application is executed within a framework.

21 Claims, 10 Drawing Sheets

| NE | Name | Parent Interface | MTU | Encapsulation | Interface State | Line State | Bundle Parent |
|---|---|---|---|---|---|---|---|
| craft-gsr-1 | POS0/4/0/0 | SonetPath0/4/0/0 | 4474 | HDLC | ADMINDOWN | ADMINDOWN | |
| craft-gsr-1 | MgmtEth0/0/CPU0/0 | None | 1514 | ETHER | UP | UP | |
| craft-gsr-1 | FINT0/0/CPU0 | None | 8000 | FINT_BASE | UP | UP | |
| craft-gsr-1 | MgmtEth0/0/CPU0/2 | None | 1500 | ETHER | ADMINDOWN | ADMINDOWN | |
| craft-gsr-1 | Null0 | None | 1514 | NULL | UP | UP | |
| craft-gsr-2 | MgmtEth0/0/CPU0/1 | None | 1514 | ETHER | ADMINDOWN | ADMINDOWN | |
| craft-gsr-2 | GigabitEthernet0/3/0/0 | Node0/3/CPU0 | 1514 | ETHER | UP | UP | |
| craft-gsr-2 | POS0/1/0/0 | SonetPath0/1/0/0 | 4474 | HDLC | ADMINDOWN | ADMINDOWN | |
| craft-gsr-2 | Loopback1 | None | 1514 | LOOPBACK | UP | UP | |
| craft-gsr-2 | POS0/1/0/2 | SonetPath0/1/0/2 | 4474 | HDLC | DOWN | DOWN | |
| craft-gsr-2 | Bundle-POS2 | None | 4474 | HDLC | ADMINDOWN | ADMINDOWN | |
| craft-gsr-2 | Loopback0 | None | 1514 | LOOPBACK | DOWN | DOWN | |
| craft-gsr-2 | Bundle-POS1 | None | 4474 | HDLC | ADMINDOWN | ADMINDOWN | |
| craft-gsr-2 | Loopback2 | None | 1514 | LOOPBACK | UP | UP | |

| Column Name | Value |
|---|---|
| NE | craft-gsr-1 |
| Name | POS0/4/0/0 |
| Parent Interface | SonetPath0/4/0/0 |
| MTU | 4474 |
| Encapsulation | HDLC |
| Interface State | ADMINDOWN |
| Line State | ADMINDOWN |
| Bundle Parent | |

22 record entries

FIG. 6

METHOD AND SYSTEM FOR RUN-TIME CUSTOMIZATION OF NETWORK MANAGEMENT APPLICATIONS

CROSS-REFERENCE TO RELATED APPLICATION

This application claims priority under U.S. Provisional Patent Application Ser. No. 60/799,928 filed May 12, 2006, entitled 'METHOD AND SYSTEM FOR RUN-TIME CUSTOMIZATION OF NETWORK MANAGEMENT APPLICATIONS', the disclosure of which is incorporated herein by reference for all purposes.

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND OF THE PRESENT INVENTION

1. Field of the Present Invention

Embodiments of the present invention relate, in general, to network management applications. More specifically, the embodiments of the present invention relate to a method and system for run-time customization of network management applications.

2. Description of the Background Art

Various network elements are required for communication across networks. Examples of network elements include, but are not limited to, hubs, switches, routers, and brouters. Commercially available network management systems, such as Craft Works Interface (CWI), enable network administrators to manage and monitor networks and network elements.

Network management systems provide network management applications for configuring and managing the network elements in the network. Configuration and management of the network elements includes fault correction, security management and inventory management. In addition, network management applications enable network administrators to also retrieve information from these network elements. The retrieved information includes, but is not limited to, performance statistics and memory usage statistics of the network elements.

However, these network management applications are fixed applications and are predefined by developers of the network management applications to configure and manage common network elements and parameters. Therefore, while network administrators may have a specific requirements for a particular network, they must use the predefined network management application as it is. Alternatively, the network administrator could request the developers to customize the network management application to accomplish the specific requirement but this is a slow and expensive process. Even with a customized version of the network management application, the network administrator usually will have to provide feedback to the developers to further improve the customized network management application. Clearly, this constitutes a long delivery cycle for the customized application and requires on-going maintenance and bug fixing by the developers. It will be appreciated that the maintenance and error fixing of a customized network management application is an expense that most developers would rather minimize or not incur if possible.

Providing customized applications that satisfy specific requests of the network administrator as well as responding to changing requirement over time is difficult and time consuming for the developers because there is little ability to achieve economy of scale. Further, different network administrators often have unique requirements, it is not possible for the developers to fulfill all of these unique requirements with a single or even multiple predefined applications.

BRIEF DESCRIPTION OF THE DRAWINGS

FIG. 6 illustrates a screenshot depicting a network management application in accordance with an embodiment of the present invention.

DETAILED DESCRIPTION OF EMBODIMENTS OF THE INVENTION

Figure 1:
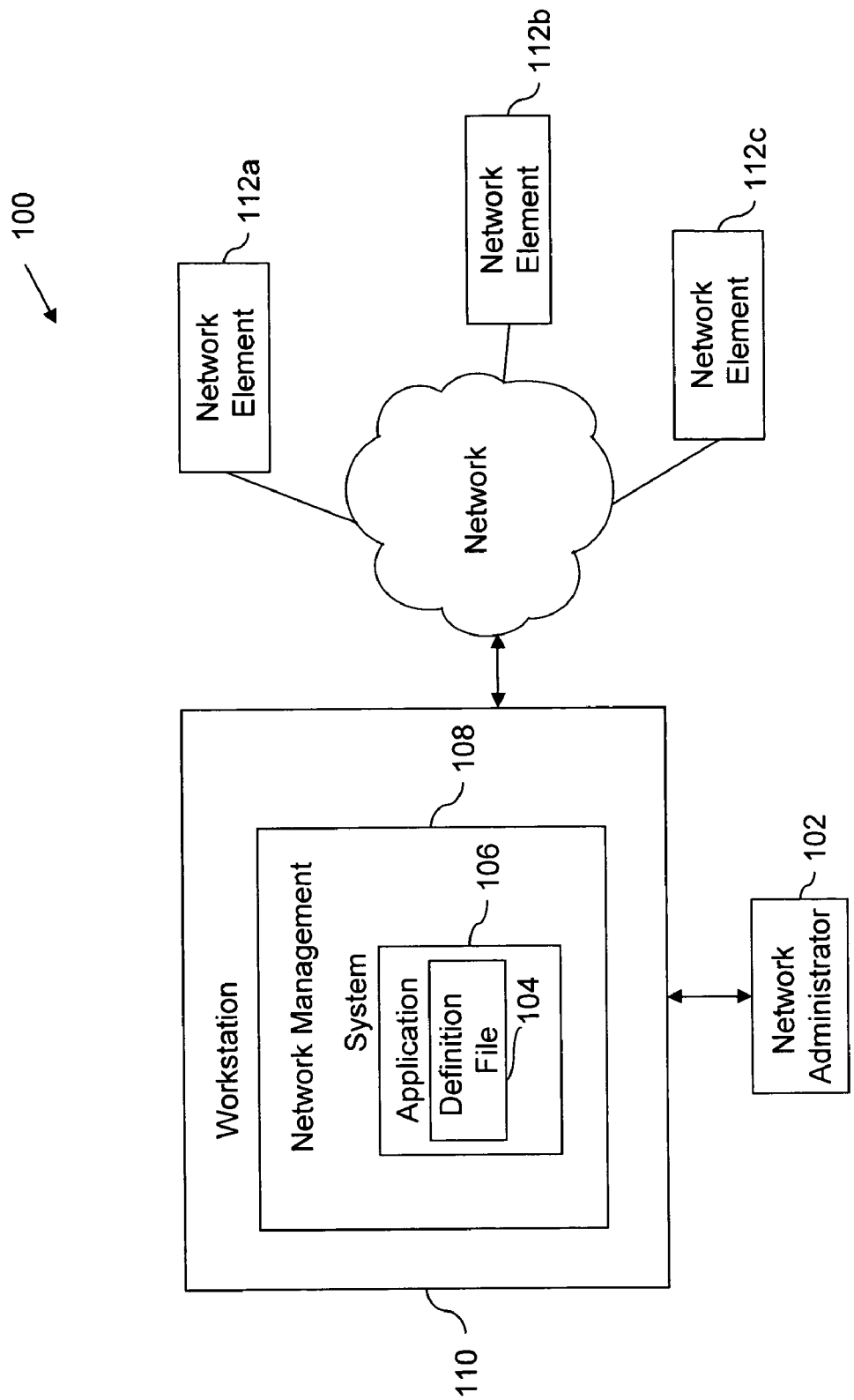
FIG. 1 illustrates an environment for implementing an embodiment of the present invention.

Embodiments of the present invention provide methods, systems, and machine-readable media for run-time customization of a network management application. In the description herein for embodiments of the present invention, numerous specific details are provided, such as examples of components and/or methods, to provide a thorough understanding of embodiments of the present invention. One skilled in the relevant art will recognize, however, that an embodiment of the present invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

In a typical embodiment, a plurality of network elements are linked to form a communication network. Examples of network elements include, but are not limited to, servers, routers, switches, routers, hubs, and other infrastructure devices. A network management system, installed on a workstation or a computer device coupled to the network, is capable of configuring and managing the network elements. A typical network management system also includes network management applications that enable a user to retrieve information related to the network elements and to change the configuration of a network element, if necessary.

In accordance with an embodiment of the present invention, a customized version of the network management application is created during run time. This means that the customized version can be executed without network downtime and without the inordinate delay attributed to a long lead time development cycle. Advantageously, the network administrators can customize the network management application and create a network management application at run time that satisfies their specific requirement. These network management applications can take advantage of common features provided by the application creation framework provided by embodiments of the present invention.

In one embodiment, the run-time creation/modification of a customized network management application is provided through a definition file that defines the application. This functionality can be further extended by providing user-defined scripts that may be linked into the customized network management application at run-time.

The scope of customization includes, by way of example, selection of a set of attributes to be retrieved from a network element (such as a router). The set of attributes define the data itself and how it is retrieved from the network element and the data is displayed on the basis of presentation attributes within the definition file. The scope of customization further includes the capability of providing post-processing through a commonly used set of formulae such as averaging, min, max, grouping functions, and the like. The scope of customization further includes flexibility in data presentation through customized graphical cell-rendering and/or hyperlinks. The scope of customization still further includes a sorting criterion that determines the order in which the rows are presented in the table. Further, the user is able to define specific sets of data to be refreshed (retrieved from the network element and the time interval to apply to these refreshes). The scope of customization further includes the flexibility of providing user-defined scripts to further manipulate data provided by the framework as well as using this framework as a conduit that can be used for the execution of commands on the network element. These commands may include, by way of example, show commands, XML requests, and the like.

In one embodiment, the definition file follows a standard XML format and can easily be manipulated through a text editor. Alternatively, a special editor such as XML Spy can be used to edit the definition file. The script (process) is launched based off of certain triggers that can be defined by the network administrator.

Referring to the drawings now, particularly by their reference numbers, FIG. 1 illustrates environment 100 for implementing an embodiment of the present invention. Environment 100 includes network administrator 102 using definition file 104 of application 106. Application 106 is an application of network management system 108 that is installed on workstation 110 and connected to a number of network elements 112. For the purpose of illustration, three network elements, namely, network elements 112a, 112b and 112c have been shown in FIG. 1 although one will appreciate that a typical network environment will comprise many such network elements and the illustrated network elements are for convenience only. Network elements 112 enable communication of data in and across networks. Examples of network elements 112 include, but are not limited to, routers, switches, hubs, optical multiplexers or other devices for an IP/MPLS core that support the integration of IP and DWDM, and service convergence driven by IP centric services Workstation 110 is present in a network that has network management system 108 installed. Workstation 110 preferably includes an operating system such as, by way of example, Windows, Linux, MAC, or Solaris. Workstation 110 also typically includes a user interface (keyboard and display unit), storage capacity for storing computer code and data and a network interface.

Network management system 108 on workstation 110 is used for retrieving information related to network elements 112. Network management system 108 reports, configures change management, ensures security, and correlates events, inventories, alerts, and other performance indicators. Examples of network management system 108 include, but are not limited to, Craft Works Interface (CWI), Simple Network Management System (SNMS), Big Brother, Open Network Management System (ONMS), IBM Tivoli, Net-Policy, CA Unicenter, Equator One, NetQoS, Alcatel 5620 Service Aware Manager, BixData, Crannog Software Netwatch, EMC Smarts Incharge, HP OpenView framework, Ilevo NMS500, Intellipool Network Monitor, IPCheck Server Monitor, iReasoning SysUpTime NMS, Lighsoft, and Microsoft Operations Manager.

Network administrator 102 retrieves information regarding network elements 112 by using network management system 108 installed on workstation 110. Network management system 108 includes one or more applications 106 for retrieving this information. Note that FIG. 1 illustrates a single application although any number of such applications may be present in a typical network management system. Network management system 108 provides application 106 for managing one or more aspects of network elements 112. An application is a program designed to perform a specific function directly for a user or for another application. Examples of applications include, but are not limited to, performance monitoring application, usage statistics monitoring application, and fault monitoring application.

Application 106 is defined by definition file 104. Every application has a definition file that defines the application and, optionally, customized scripts that further customize output. Definition file 104 contains key information about using application 106, output of application 106 on executing, retrieving information from network elements 112, defining presentation of the data, and so forth. In addition, definition file 104 provides information on rendering, hyperlinking, and scripting. Definition file 104 is preferably in Extensible Markup Language (XML) format although other formats can be selected depending on engineering considerations. According to an embodiment of the present invention, definition file 104 is accessed from a text editor such as Notepad (a text editor available under Windows operating systems) or a command line editor. Notepad and Windows are trademarks of Microsoft Corporation. It is to be understood that the actual manner for accessing and modifying definition file 104 is typically an engineering selection that is based at least in part on the selected platform. To illustrate, the following is an exemplary definition file provided by CWI network management system:

<Preferences Application="InterfacePktIntegrated" AppDisplay="Interface/Pkt Integrated" AdminApplication="false">
<Version Major="1" Minor="0"/>
<TablePreferences Record="//Interface/InterfaceView" RefreshInterval="None">
<Presentation>
<Property Name="NEName" Display="NE" RefreshInterval="0" Visible="true"/>

```
<Property Name="InterfaceName" Display="Name"
RefreshInterval="0" Visible="true"/>
<Property Name="ParentInterface" Display="Parent Inter-
face" RefreshInterval="0" Visible="true"/>
<Property Name="MTU" Display="MTU" RefreshInter-
val="0" Visible="true"/>
<Property            Name="Encapsulation"
Display="Encapsulation"      RefreshInterval="0"
Visible="true"/>
<Property Name="InterfaceState" Display="Interface State"
RefreshInterval="0" Visible="true"/>
<Property Name="InterfaceLineState" Display="Line
State" RefreshInterval="0" Visible="true"/>
<Property Name="BundleInterfaceName" Display="Bundle
Parent" RefreshInterval="0" Visible="true"/>
<Property Name="OutputPkts" Display="Output Packets"
Presenter="HorizontalBar"     RefreshInterval="0"
Visible="true">
<DisplayProperties          InTableCapable="true"
OutTableCapable="false">
<HorizontalBarProperties    HorizontalBarType="Binary"
BarColor="WHITE">
<BarThreshold         ThresholdValue="1000000"
BarColor="YELLOW"
ThresholdDescription="Threshold_1"
ThresholdDirection="Up"/>
<BarThreshold         ThresholdValue="2000000"
BarColor="ORANGE"
ThresholdDescription="Threshold_2"
ThresholdDirection="Up"/>
<BarThreshold         ThresholdValue="3000000"
BarColor="RED" ThresholdDescription="Threshold_3"
ThresholdDirection="Up"/>
</HorizontalBarProperties>
</DisplayProperties>
</Property>
<Property Name="InputPkts" Display="Input Packets"
Presenter="HorizontalBar"     RefreshInterval="0"
Visible="true">
<DisplayProperties          InTableCapable="true"
OutTableCapable="false">
<HorizontalBarProperties    HorizontalBarType="Binary"
BarColor="WHITE">
<BarThreshold         ThresholdValue="1000000"
BarColor="YELLOW"
ThresholdDescription="Threshold_1"
ThresholdDirection="Up"/>
<BarThreshold         ThresholdValue="2000000"
BarColor="ORANGE"
ThresholdDescription="Threshold_2"
ThresholdDirection="Up"/>
<BarThreshold         ThresholdValue="3000000"
BarColor="RED" ThresholdDescription="Threshold_3"
ThresholdDirection="Up"/>
</HorizontalBarProperties>
</DisplayProperties>
</Property>
</Presentation>
<UserScript Name="Script_1" ExecCmd="perl-w
o:\cwi\scripts\InterfacePktIntegrated.pl" Logging="true"
TimeoutValue="0" UsageType="Integrated">
<InputProperties>
<Property Name="NEName"/>
<Property Name="InterfaceName"/>
<Property Name="InterfaceState"/>
</InputProperties>
<OutputProperties>
<Property Name="InputPkts" Type="Long"/>
<Property Name="OutputPkts" Type="Long"/>
</OutputProperties>
</UserScript>
</TablePreferences>
</Preferences>
```

Application 106 is predefined by the developers of applications. Therefore, application 106 is predefined for a particular use. In case network administrator 102 wants to use application 106 to accomplish a specific requirement, then network administrator 102 can customize predefined application 106 according to the specific requirement. Network administrator 102 may customize application 106 from workstation 110 to modify definition file 106 and user scripts, if any.

Figure 2:
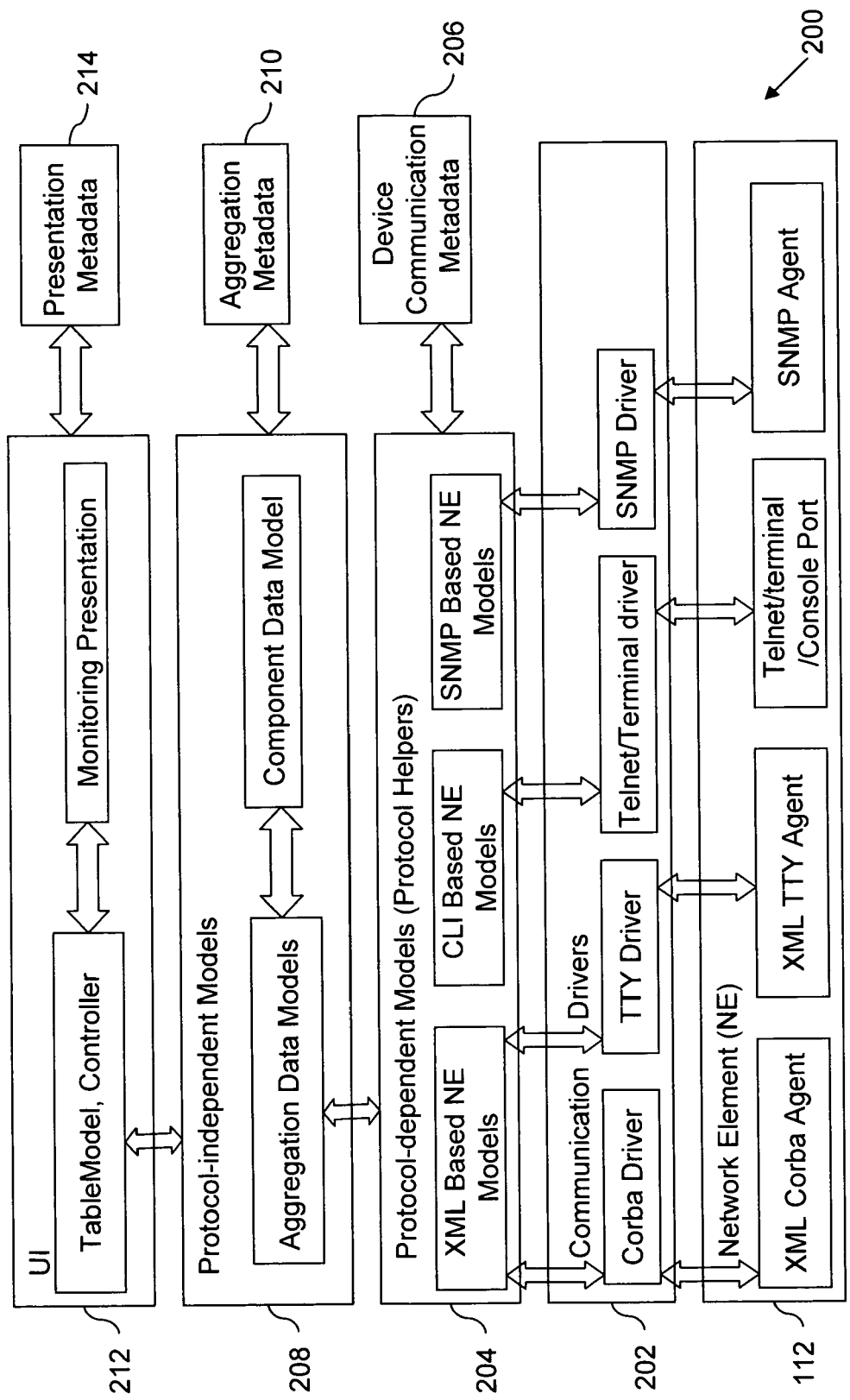
FIG. 2 illustrates a system architecture of an environment for implementing an embodiment of the present invention.

FIG. 2 illustrates system architecture 200 of environment 100 for implementing an embodiment of the present invention. System architecture 200 includes network elements 112, communication drivers 202, protocol-dependent models 204, device communication metadata 206, protocol-independent models 208, aggregation metadata 210, user interface (UI) 212 and presentation metadata 214. Network elements 112, communication drivers 202, protocol-dependent models 204, protocol-independent models 208 and UI 212 form various architectural levels of system architecture 200.

Network elements 112 are devices used for communicating data in and across networks. Network elements 112 also provide support and services to network administrator 102 and are managed by network management system 108. In case of CWI network management system, network elements 112 can be accessed through selected protocols or interfaces such as, by Extensible Markup Language (XML) Common Object Request Broker Architecture (CORBA) Agent, XML TTY Agent, Telnet/Terminal/Console Part and Simple Network Management Protocol (SNMP) Agent.

Communication drivers 202 enable network management system 108 to communicate with network elements 112 by using connection methods. Connection methods include, but are not limited to, Command Line Interface (CLI)-Serial (Console) Port, CLI-Terminal Server (to console port), CLI-Telnet/SSH v1, v2, Extensible Markup Language (XML)-Telnet/SSH v1, v2, XML-CORBA/SSL.

Communication drivers 202 such as CORBA, TTY, and SNMP are provided for all types of network elements 112. Communication drivers 202 send data retrieval requests from workstation 110 to network elements 112, obtain responses from network elements 112, and provide the responses to workstation 110.

Protocol-dependent models 204 are also known as protocol helpers and are aware of communication protocol. These network models use specific protocol for communication and communicate with the network element models that use the same protocol. Each protocol-dependent model 204 supports a single protocol, however, an application can combine more than one protocol-dependent model 204 to support more than one protocol. Protocol-dependent models 204 create protocol-specific requests for network management system 108 and pass on the requests to communication drivers 202. Further, protocol-dependent models 204 parse responses received from communication drivers 202. Protocol-dependent models 204 can be based on multiple protocols such as XML-based models, CLI-based models and SNMP-based models, etc. Protocol-dependent models 204 use device communication metadata 206 to generate protocol-specific requests and parse the responses.

Device communication metadata 206 reflects how the data is organized on network elements 112. In addition, device communication metadata 206 reflects how data is retrieved by network administrator 102 using application 106 from workstation 110.

Protocol-independent models 208 are unaware of communication protocol. Protocol-independent models 208 forward data-loading requests to protocol-dependent models 204. Protocol-independent models 208 can interact with different protocol-dependent models 204 for data retrieval. In case of complex processes such as data integration and grouping of data-loading requests, protocol-independent models 208 use aggregation metadata 210 for organizing and aggregating the data. On the basis of the interaction with protocol-dependent models 204, protocol-independent models 208 can be categorized in two categories: Component data models and Aggregation data models.

Component data models directly interact with protocol-dependent models 204 for data retrieval. Each component data model is responsible for dealing with data from one or more protocol-dependent models 204.

Aggregation data models do not interact directly with protocol-dependent models 204. Instead, aggregation data models delegate data-loading tasks to various component data models. Further, the various component data models use protocol-dependent models 204. Therefore, aggregation data models can carry out complex data processing such as data integration and grouping.

UI 212 displays the data received as a result of the requests placed with network elements 112. Data is displayed in the form of a table and such table models belong to UI 212. The presentation of the data in the tables, including column header, display style (such as plain text, line chart, bar chart etc.), refresh frequency, is decided according to presentation metadata 214 in definition file 104. The data is displayed according to presentation metadata 214 that includes information about how the data is presented in tabular form. Presentation metadata 214 is saved as a part of definition file 104.

Network administrator 102 uses components of system architecture 100 to customize application 106 and the customized application functions in accordance with system architecture 100. Network administrator 102 uses a tool for customizing application 106, which is discussed in detail in conjunction with FIG. 3.

Figure 3:
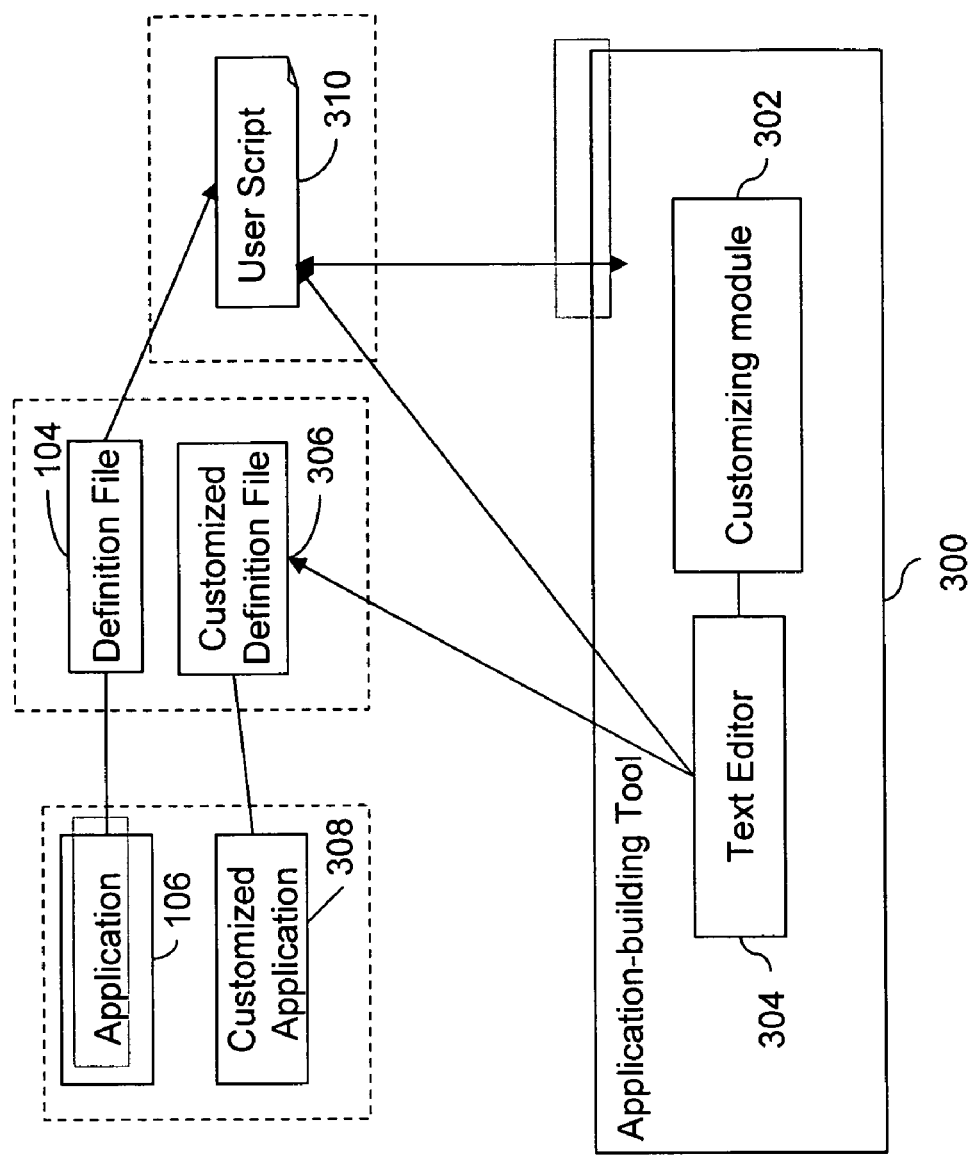
FIG. 3 illustrates an application-building tool for customizing a network management application in accordance with an embodiment of the present invention.

FIG. 3 illustrates application-building tool 300 for customizing application 106 in accordance with an embodiment of the present invention. Application-building tool 300 includes customizing module 302 and text editor 304. Further, customizing module 302 includes means for providing network management application 106 for customization. After customizing application 106 by using application-building tool 300, definition file 104 is customized and results in customized definition file 306. Similarly, application 106 is customized and results in customized application 308.

Application-building tool 300 allows network administrator 102 to customize application 106. Network administrator 102 customizes application 106 to result in customized application 308, which is used to satisfy the specific requirements related to network management. The customization of application 106 includes creating customized application 308 and modifying application 106 to generate customized application 308. Application-building tool 300 allows network administrator 102 to customize application 106 at run time. The run-time customization is provided through definition file 104, which defines application 106. This functionality can be further extended by providing user script 310, which can be linked with application 106 at run time. User script 310 is a script written by network administrator 102 to customize application 106. Definition file 104 follows an Extensible Markup Language (XML) format, which can be modified through text editor 304. Examples of text editor include, but are not limited to, WordPad, Notepad. Text editor 304 is a code editor. Customizing module 302 provides application 106 to network administrator 102 for customizing application 106. Thereafter, network administrator 102 customizes application 106 to satisfy the specific requirements.

Figure 4:
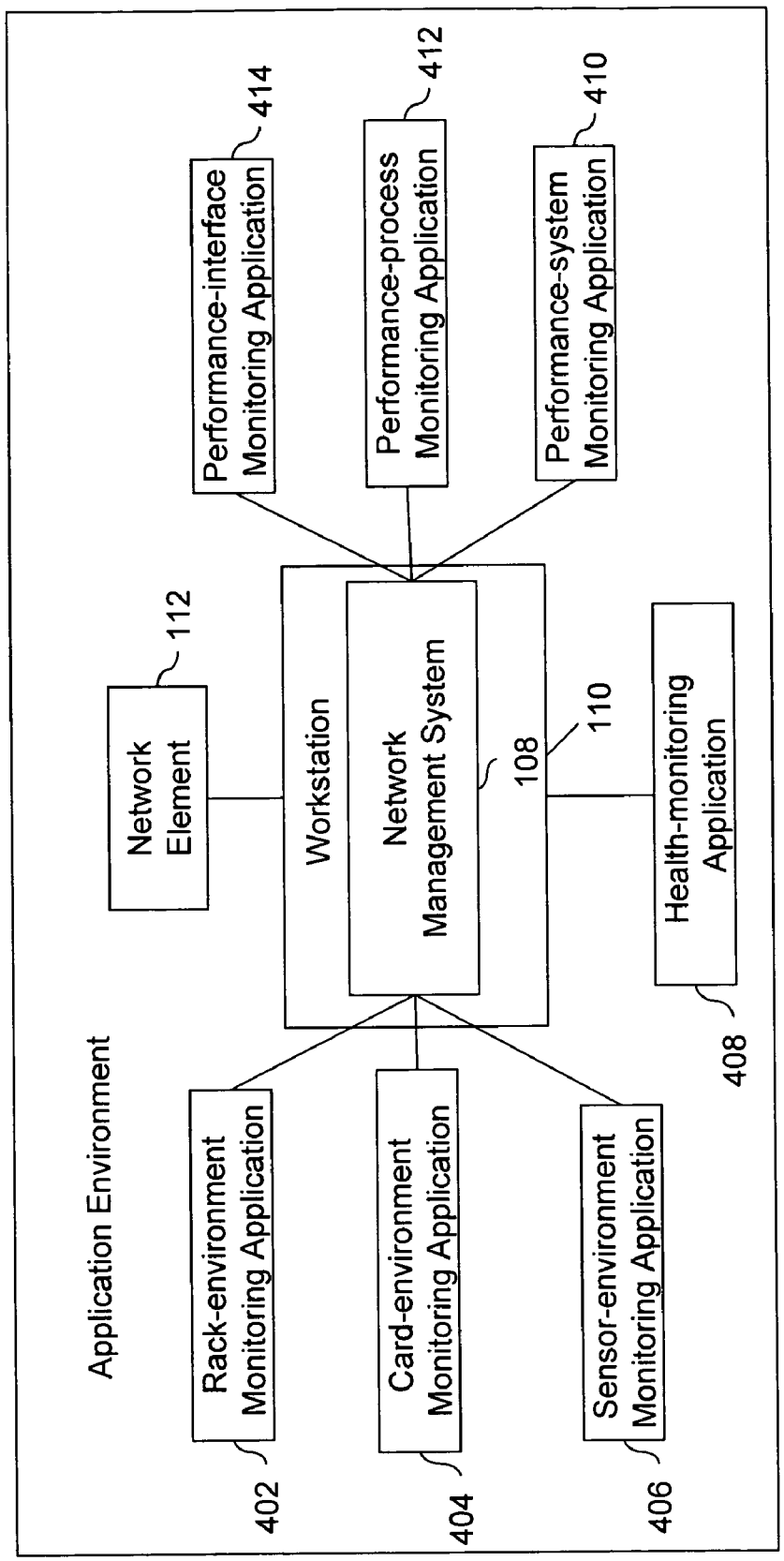
FIG. 4 illustrates a network management system in accordance with an embodiment of the present invention.

FIG. 4 illustrates various applications provided by network management system 108 in accordance with an embodiment of the present invention. An exemplary network management system 108 such as CWI provides seven applications. These applications include rack-environment monitoring application 402, card-environment monitoring application 404, sensor-environment monitoring application 406, health-monitoring application 408, performance-system monitoring application 410, performance-process monitoring application 412, and performance-interface monitoring application 414. These applications are used for monitoring various aspects of network elements 112. For example, performance-system monitoring application 410 provides information regarding performance statistics of network elements 112 such as memory-usage statistics. Further, card-environment monitoring application 404 provides information regarding network interface cards present in the network.

Figure 5:
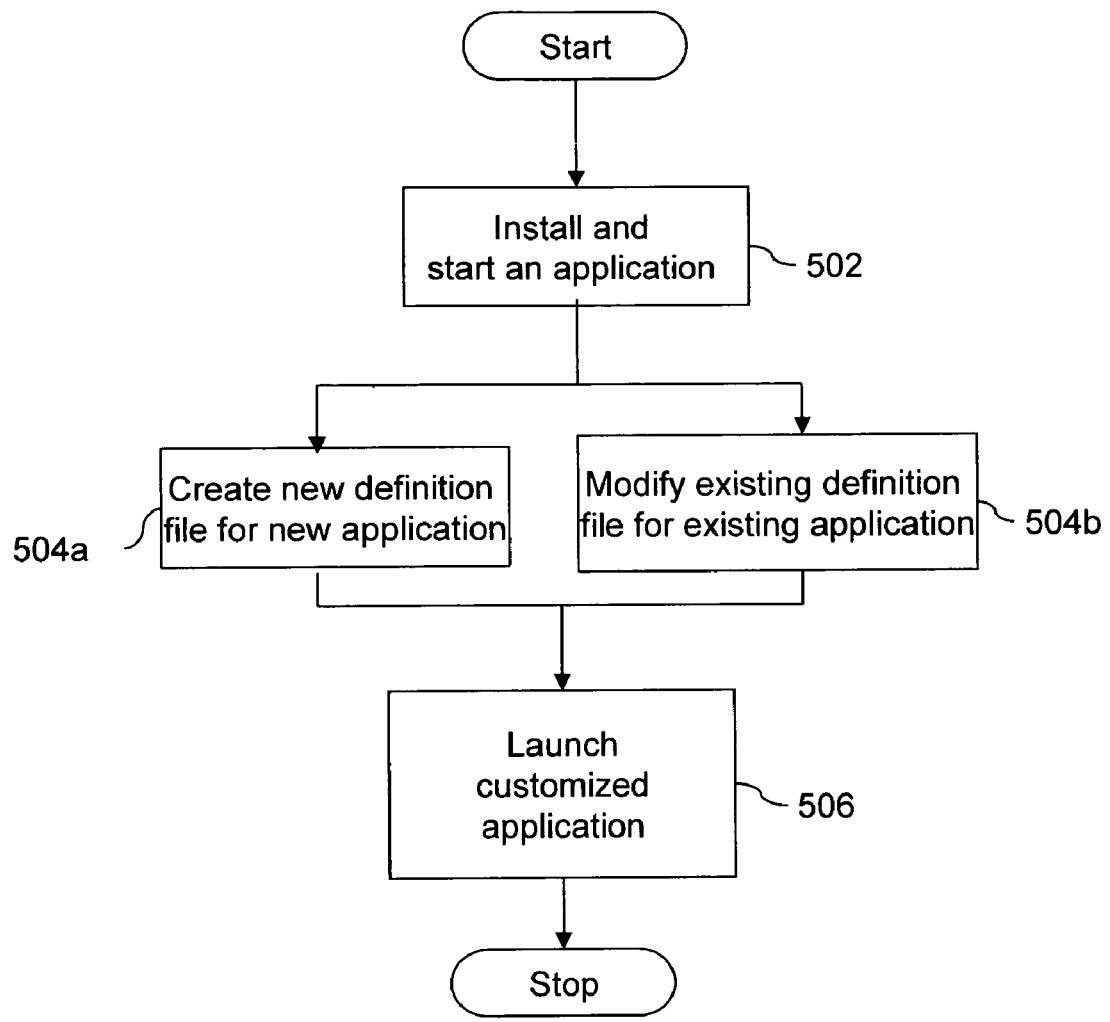
FIG. 5 illustrates a flow diagram of a method for customizing a network management application in accordance with an embodiment of the present invention.

FIG. 5 illustrates a flow diagram of a method for customizing application 106 in accordance with an embodiment of the present invention. At 502, application 106 is installed on workstation 110 by network administrator 102. Application 106 is included in network management system 108. Network administrator 102 installs network management system 108 on workstation 110. Network administrator 102 also selects and starts application 106 from various applications provided by network management system 108. Network administrator 102 uses application 106 from workstation 110. Network management system 108 provides various other applications for monitoring other aspects of network elements 112 in the network. The exemplary applications have been listed in conjunction with FIG. 4.

At 504, one of the two different definition files 104 is created. In one instance, at 504a, application-building tool 300 creates a new definition file for a new application. Alternatively, at 504b, definition file 104 is modified and results in customized definition file 306, which defines customized application 308. Application 106 is provided to network administrator 102 for customization by customizing module 302. Network administrator 102 opens definition file 104 in text editor 304, or other Graphical User Interface (GUI)-based editor and modifies definition file 104.

According to an embodiment of the present invention, network administrator 102 creates customized application 308 that is based on user script 310. The script can be written by way of example, in Perl programming language, Java programming language, C programming language, C++ Programming language, Tool Command Language (TCL), etc. It will be appreciated that user script 310 can be written in any language that operates on Stdin and Stdout. Stdin and Stdout are pre-connected input and output channels between a software program and its environment. An input for the software program is read through Stdin and an output is provided through Stdout.

Network administrator 102 creates user script 310 to customize application 106. In this case, user script 310 carries out the retrieval and processing of data, whereas network management system 108 is used only for displaying data to network administrator 102.

The script launch mechanism and the protocol used to transfer data between network management system 108 and user script 310 use the Stdin and Stdout streams, including error responses and a network element communication 'pass-through' or 'conduit' provided by network management system 108.

The approach used for creating user script 310 is referred to as stand-alone approach and user script 310 is referred to as a stand-alone script. Stand-alone refers to a type of scripted application that does not require pre-existing data retrieved by network management system 108 from network elements 112 as the stand-alone script itself supplies that data. The only thing passed by network management system 108 to the stand-alone script is the launch context.

The stand-alone script takes care of all data retrieval and processing requirements. More specifically, common tabular features of network management system 108 such as sorting, searching, filtering, exporting, and printing are used in this approach. The stand-alone script sends Command Line Interface (CLI) or Extensible Markup Language (XML) requests to network elements 112 through network management system 108. The stand-alone approach utilizes a pass-through mechanism for network management system 108. Pass-through mechanism means that network management system 108 passes the requests from user script 310 to network elements 112, and forwards the response from network elements 112 to user script 310.

The stand-alone script refers to programs written by network administrator 102, which are launched by using network management system 108. Network management system 108 is required only for displaying an output. To launch the stand-alone script, the stand-alone script communicates with network management system 108 with a proprietary mechanism. Information such as the executable path, timeout, input/output script parms about the stand-alone script is supplied in the customized definition file 306. The stand-alone script takes care of all data loading and processing, and solely supports customized application 308.

Alternatively, network administrator 102 customizes application 106 to fetch more information displayed in the table, i.e., add new columns in the table. In case network administrator 102 prefers to use application 106 for monitoring network elements 112, and desires to have more information displayed in the table, then network administrator 102 can adopt an integrated approach of customization. According to the integrated approach, application 106 of network management system 108 performs the data loading and sends the loaded data as an input to a user script, known as an integrated script. The integrated script processes the input data and returns the results to network management system 108. Henceforth, the integrated script, in conjunction with customized definition file 306, forms customized application 308. Definition file 104 is also modified to form customized definition file 306 that defines customized application 308. The integrated script communicates with network management system 108 through a set of proprietary mechanisms such as read input from network management system 108, perform data processing, and supply results to network management system 108, which are displayed in new columns of the existing table.

The integrated approach includes data retrieval and processing and passes on the processed data to the integrated script. The integrated script uses existing attributes from the attribute pool or predefined data (table data already existing in aggregation metadata 210) and supplemented with a script that does some additional processing such as adding new columns to existing rows. All rows of data are passed into the integrated script. In general, the integrated script carries out additional processing and obtains a result. This application integrates results from the existing framework and the integrated script.

Both stand-alone and integrated script applications launch a user-defined script at the appropriate trigger point. For the stand-alone scripts, this trigger point occurs at the launch of application 106. For the integrated scripts, this trigger point occurs immediately after all the required data from each one of network elements 112 is retrieved. The script launch is configurable and is defined in definition file 104 as a command. The command to be executed can be perl, tcl, sh, or any other executable program. The executed script needs to read from Stdin and write to Stdout. After user scripts 310 are launched and till they are terminated, the flow of communication between the existing framework and this process follows a well-defined protocol. This protocol specifies data encoding along with delimiters, etc. as well as ACKs and NACKs. In addition, error data can be encoded by user script 310 and passed back to the existing framework for presentation in an error dialog. Another capability provided by this protocol is the capability of user script 310 to send either CLI or XML requests to network elements 112. This mode of data transfer between user scripts 310 and network elements 112 is called the 'pass-through' mode or network element communication 'conduit'. The existing framework takes care of establishing connection/negotiation, etc., and reuses existing connections for greater efficiency. Both stand-alone and integrated scripts make use of this 'pass-through capability'.

In another instance, network administrator 102 creates customized application 308 through definition file 104 by selecting and inserting a set of predefined attributes that are available in the attribute pool in the form of an XML list of attributes. Network management system 108 has the set of pre-defined attributes of network elements 112 in the form of the attribute pool. Network administrator 102 can select a set of these pre-defined attributes from the attribute pool and thereby customize application 106 that satisfies the specific network administrator requirement.

At 506, customized application 308 launched or relaunched of the individual application within the currently running CWI GUI although the CWI GUI need not itself be relaunched. After successfully launching customized application 308, network administrator 102 obtains the desired output to satisfy the specific requirements. The specific requirements include configuring presentation properties, modifying the presentation style of the data such as setting the column header of the columns in the table, setting a refresh interval for the whole table, or individual columns, displaying numeric-based table cells with a horizontal bar chart, setting the sorting order for individual columns, and so forth. In addition, the customization of application 106 results in customized application 308 that allows post-processing in the modified table through formulae such as averaging, minimizing, maximizing, grouping functions, and so forth. The modified table includes modified presentation with graphical cell-rendering, i.e., highlighting of cells, which have a numeric value above a threshold value.

FIG. 6 illustrates a screenshot depicting application 106 in accordance with an embodiment of the present invention. The screenshot represents a window in the CWI network management system that is used as an example of network management system 108. The window presents interface-viewer window 602, which is a result of execution of application 106 for viewing data regarding interfaces related to network elements 112 in the network. Interface viewer window 602 shows eight columns that provide information regarding the interfaces related to network elements 112 in the network.

Figure 7:
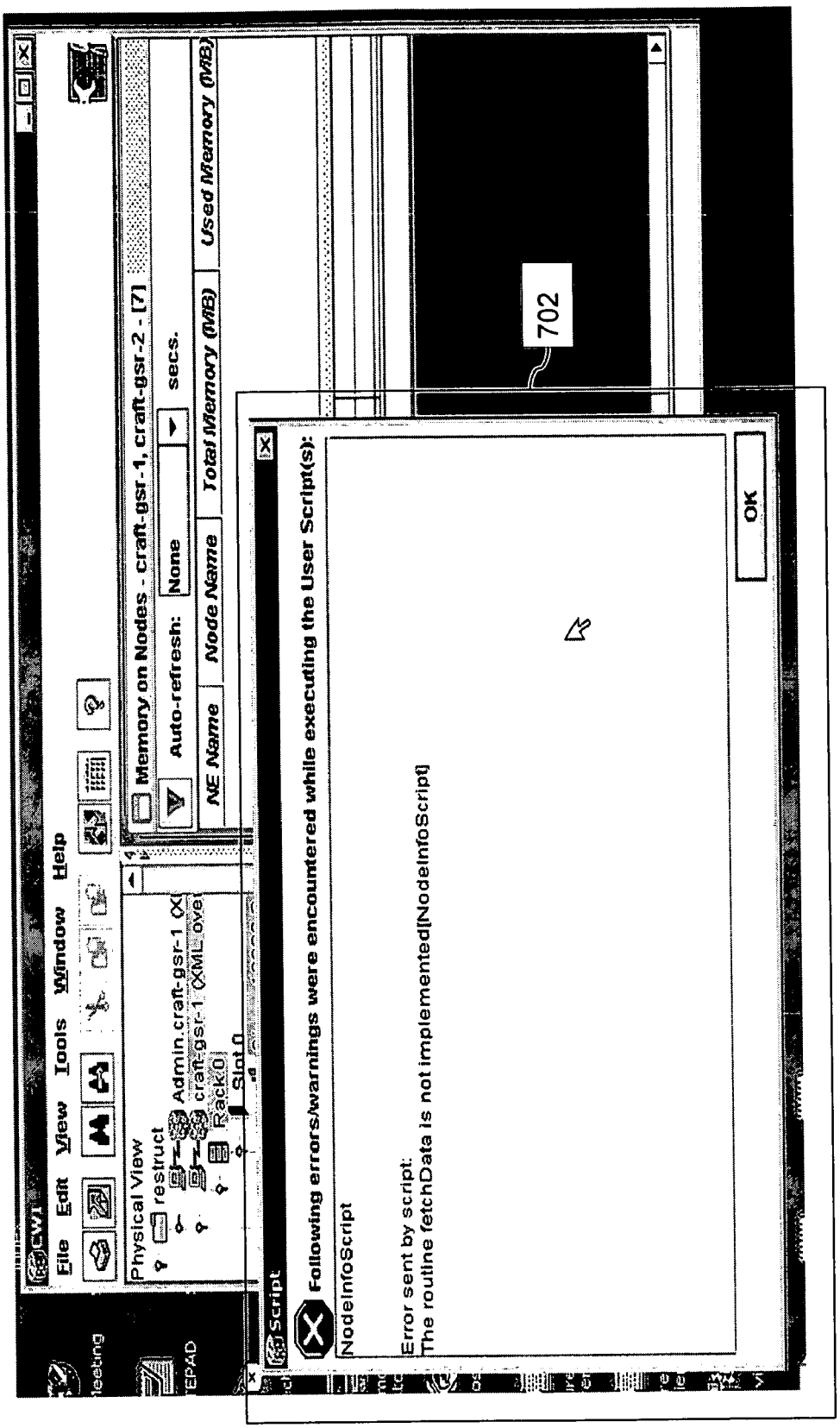
FIG. 7 illustrates a screenshot depicting an error window in accordance with an embodiment of the present invention.

According to an embodiment of the invention, various operations are performed for customizing application 106. The operations include querying command line interface (CLI) for a display message, for example, a display message to display node memory usage such as 'show memory summary location all'. An exemplary textual output is presented below:
RP/0/0/CPU0:craft-gsr-1#show memory summary location all
node: node0__0_CPU0
Physical Memory: 1024M total
Application Memory: 770M (180M available)
Image: 189M (bootram: 189M)
Reserved: 64M, IOMem: 492M, flashfsys: 0
Total shared window: 8M
node: node0__4_CPU0
Physical Memory: 512M total
Application Memory: 472M (231M available)
Image: 19M (bootram: 19M)
Reserved: 20M, IOMem: 0, flashfsys: 0
Total shared window: 71M FIG. 7 illustrates a screenshot depicting error window 702 in accordance with an embodiment of the present invention. This screenshot represents error window 702 that is obtained as a result of executing user script 310. Error window 702 is obtained in case there is an error during execution of user script 310. The error is rectified by network administrator 102. An exemplary version of user script 310 is presented below:

```
# Basic script to demonstrate communication with CWI through scripting.
# This is the directory where both the cwitalk.pm and container.pm
# are located. Change it if the modules are in different location
use lib "C:\\cwiscript_tutorial_1\\lib";
# Logfile name, please make sure the directory exists
# To deploy the script on another platform, modify this setting accordingly
use constant LOGFILE_NAME => "C:\\cwiscript_tutorial_1\\logs\\scriptlog.txt";
use cwitalk;
use container;
use IO::File;
use node_xml_parse;
use memory_cli_parse;
use strict;
# Initialize our logfile first
my $logFileHandle = new IO::File( LOGFILE_NAME, "w");
if ( !defined $logFileHandle )
{
    die( "Failed to open log file LOGFILE_NAME for writing!");
}
# Write data to log file
sub my_log( $$ )
{
    my ( $logfh, $msg ) = @_;
    print $logfh "<LOG>: $msg\n";
    $logfh->flush( );
}
# Input:
# $container: the input data container, with column name: ObjectID
# Output:
# An array of router names
sub getRouterContext( $ )
{
    my ( $container ) = @_;
    my %hRouters = ( );
    while ( my $row = $container->next( ) )
    {
        my $objectID = $row->{'ObjectID'};
        $objectID =~ s/\ s*$//;
        if ( $objectID =~ /^\/\/(.*?)\// )
        {
            $hRouters{$1 } = 1;
        }
        elsif( $objectID =~ /^\/\/(.*?)$/ )
        {
            $hRouters{ $1 } = 1;
        }
    }
    return ( keys %hRouters ) ;
}
# Input:
# $aRouters: reference to an array of router names
# Output:
# [1, error_message] on error
# [0, $container] on success. container column names:
# NEName, NodeName, TotalMemory, UsedMemory,
# UsedOverTotalMemoryRatio, UpTime
sub fetchData( $ )
{
```

-continued

```perl
    my ( $aRouters) =@_;
        return [1. "The routine fetchData is not implemented"];
}
# Main routine.
sub main( )
{
  my $dataContainer;
  my $returnContainer;
  my $rc;
  my $cmd;
    my_log( $logFileHandle, "BEGIN MAIN");
  # Read CWI input from STDIN using cwitalk::read_data_records( )
  # The method returns an array:
  # [1, $error_message] on error
  # [0, $container] on success
  my $aParsed = cwitalk::read_data_records( );
  # A traditional return mechanism in Perl is to use an array of two values.
  # The first entry being 0 if successful and the second being either the
  # actual data or an error message.
  # Here we are getting back the data which was passed to us by CWI.
  if ( $aParsed->[0] )
  {
     my $msg = $aParsed->[1];
     my_log( $logFileHandle,"ERROR: $msg" );
  }
  else
  {
    # Test manipulating data. We are now using the second entry
    # since the first entry indicated no error.
    $dataContainer = $aParsed->[1]
    $dataContainer->dump( $logFileHandle );
    $dataContainer->reset_iterator( );
      my @aRouters = getRouterContext( $dataContainer );
      foreach my $router ( @aRouters )
    {
      my_log( $logFileHandle, "RouterName: $router" );
    }
      my $aFetched = fetchData(\@aRouters );
    #Notify CWI of error if any, otherwise serialize
    #the container and write back
    if ( $aFetched->[ 0 ] )
    {
       cwitalk::send_err( $aFetched->[1] );
    }
    else
    {
       my $retContainer = $aFetched->[1];
       if ( defined $retContainer )
       {
          cwitalk::send_result( $retContainer );
       }
    }
  }
  # We are done so signal to CWI we are now done.
  cwitalk::end_script( );
  my_log( $logFileHandle, "END MAIN" );
}
my_log( $logFileHandle, "CWI HOME: $ENV{'CWI_HOME'}" );
# Start main method.
main( );
exit 0;
```

After obtaining error window 702, the details of the error are forwarded to network management system 108. Further, a script for fetching the data from network element 112 and defining the presentation of the data in the tabular form is written and executed in conjunction with user script 310. An exemplary script for fetching the data is presented below:

```perl
# Input:
# $aRouters: reference to an array of router names
# Output:
# [1, error_message] on error
# [0, $container] on success. container column names:
# NEName, NodeName, TotalMemory, UsedMemory,
# UsedOverTotalMemoryRatio, UpTime
sub fetchData( $ )
{
```

```
    my ( $aRouters ) = @_;
       my $ret = [ 0, undef ];
    my @aColumns = ( 'NEName', 'NodeName', 'TotalMemory', 'UsedMemory',
           'UsedOverTotalMemoryRatio', 'UpTime' );
    # Each member of this array is a reference to an array
    # which holds 6 members, with the sequence in @aColumns
    my @aRows = 0;
       my $cli = "show memory summary location all";
    my $xmlreq = "
<?xml version = '1.0' encoding='UTF-8'?>
<Request>
   <Get>
      <Operational>
         <Inventory>
            <RackTable />
         </Inventory>
      </Operational>
   </Get>
</Request> ";
    # Loop through all routers and send CLI and XML for each of them
    foreach my $ne_name ( @$aRouters )
    {
       my $aNodeMem = [ ];
       my $cli_ret = cwitalk::send_cli_request( $ne_name, $cli );
       if ( $cli_ret->[0] )
       {
          my $err_msg = $cli_ret->[1];
          my_log( $logFileHandle, "Error send cli: $err_msg" );
          $ret = $cli_ret;
          last;
       }
       else
       {
          my $cli_output = $cli_ret->[1];
          my_log( $logFileHandle, "CLI output: Scli_output" );

my @aLines = split /\n/, $cli_output;
          $aNodeMem = memory_cli_parse::parse_memory(\@aLines );
          my $hNodeUptime = { };
             # Query uptime with XML only if there are nodes returned
          if ( $#{$aNodeMem} >= 0 )
          {
             my $xml_ret = cwitalk::send_xml_request( $ne_name, $xmlreq );
             if ( $xml_ret->[ 0 ] )
             {
                my $err_msg = $xml_ret->[1];
                my_log( $logFileHandle, "Error send xml: $err_msg" );
                $ret = $xml_ret;
                last;
             }
             else
             {
                my $xmlresp = $xml_ret->[1];
                my_log( $logFileHandle, "XML response: $xmlresp" );
                my $parse_ret = node_xml_parse::parse_node_xml( $xmlresp );
                my_log( $logFileHandle, $@ );
             if ( $parse_ret->[0] )
             {
                my_log( $logFileHandle,
                   "XML parsing for $ne_name: $parse_ret->[1]" );
             }
                elsif ( defined $parse_ret->[1] )
                {
                   $hNode Uptime = $parse_ret->[1];
                }
             }
             foreach my $hRow( @$aNodeMem )
          {
             my $node_name = $hRow->{'node'};
             my $uptime = $hNodeUptime->{$node_name};
             $uptime = 0 unless ( defined $uptime );
             push @aRows, [ $ne_name, $node_name,
                $hRow->{'totalmem'}, $hRow->{'usedmem'},
                $hRow->{'usedratio'},
                $uptime ];
          }
       }
    }
}
```

-continued

```
if ( !$ret->[0] && ( $#aRows >= 0 ) )
{
    $ret = [0, new container(\@aColumns, \@aRows )];
}
    return $ret;
}
```

After executing user script 310 along with a fetch script, customized application 308 is launched. A single script can be used, which combines both the user script 310 and the fetch script.

Figure 8:
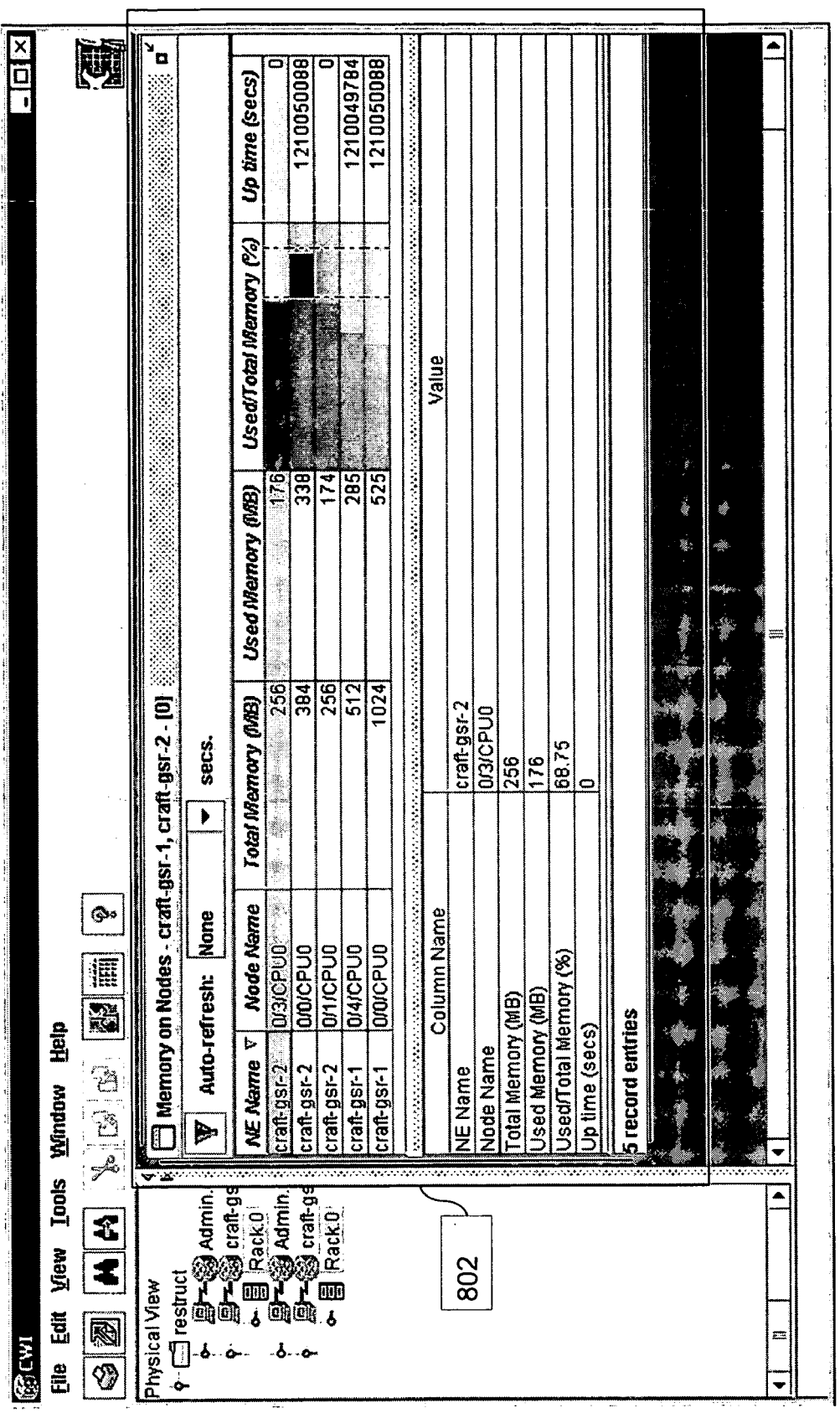
FIG. 8 illustrates a screenshot depicting a user-customized output in accordance with an embodiment of the present invention.

FIG. 8 illustrates a screenshot depicting a user-customized output in accordance with an embodiment of the present invention. The screenshot represents successful execution of user script 310. The screenshot presents a tabular output 802 with eight columns, which provide information regarding memory usage on network elements 112.

Figure 9:
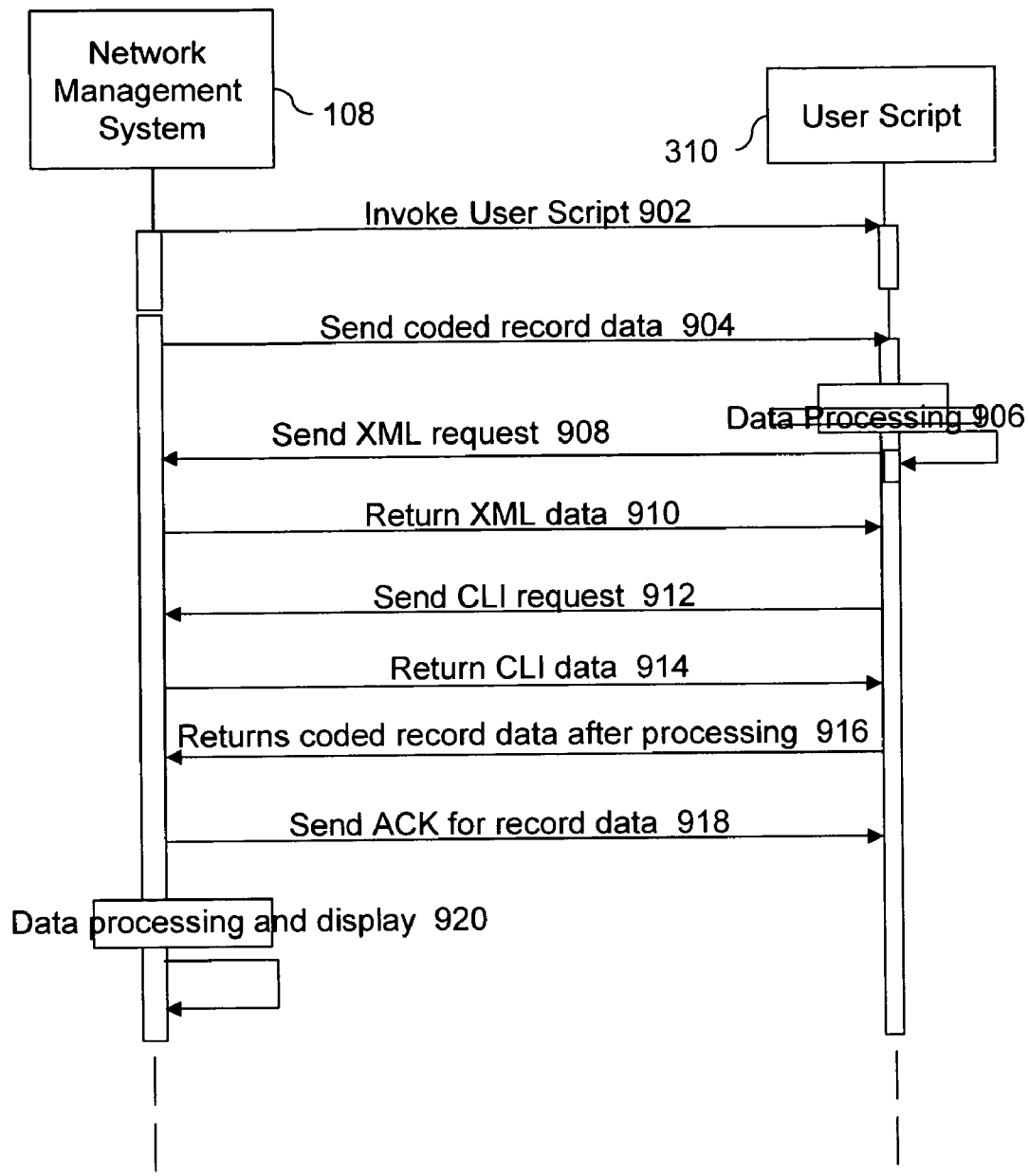
FIG. 9 illustrates a flow diagram of a method for communicating with a script in accordance with an embodiment of the present invention.

FIG. 9 illustrates a flow diagram of a method for communicating with user script 310 in accordance with an embodiment of the present invention. At 902, network management system 108 invokes user script 310. User script 310 is written by network administrator 102 in order to customize application 106. At 904, network management system 108 sends coded record data to user script 310. Network management system 108 then sends the coded record data to user script 310 through the Stdin. The record data is coded according to a data-encoding mechanism. As a general rule of the data-encoding mechanism, each coded record data is an XML-like string but without the XML header. The coded record data starts with an open tag and ends with a close tag. For instance, if the coded record data starts with <SIG_CWI_SEND_XML> then it will end with </SIG_CWI_SEND_XML>. However, short-handed XML close-tag is not allowed. Strings between tags are data tokens. All data tokens are URL-encoded and have to be decoded before use. All tags and data are case-sensitive.

According to this data-encoding mechanism, the table header, rows and columns are converted to strings before sending to user script 310. The data encoding steps include: each table cell including the header is transformed in the strings. Further, all strings are URL-encoded. This means that all non-alphanumeric characters are converted to a hexadecimal number and prefixed with '%'. For instance, a forward slash '/' is converted to '%2F', and space is converted to '+'. Thereafter, in each row, every URL-encoded cell is joined by the '/' character and all rows are joined by the '$' character to form a single line. The final string sent to user script 310 is in a single line. The single line starts with a header indicating start of data: <SIG_CWI_DATA>, followed by the encoded string and the close tag </SIG_CWI_DATA>, and terminates with a new line character '\n'. In addition, data in the tabular form, as presented by network management system 108, is provided.

At 906, user script 310 reads, parses and processes the coded record data obtained from network management system 108. At 908, user script 310 sends an XML request to network elements 112 through network management system 108. Network management system 108 acts as a 'pass-through'. The XML request from user script 310 is encoded according to the data-encoding mechanism and is sent to network management system 108 in a single line. For example, an XML request is presented below:

<?xml version='1.0' encoding="UTF-8"?>
  <Request>
    <Get xmlns:xsi="http://www.w3.org/2001/XMLSchema-instance">
      <Operational>
        <InterfaceProperties/>
      </Operational>
    </Get>
  </Request>

The XML request provided above is encoded according to the data-encoding mechanism. The encoded XML request starts with the open tag <SIG_CWI_SEND_XML>. The part following the open tag denotes the name of network element 112, for which the XML request is sent. The format of this part is:

<SIG_CWI_NE_NAME>+Base64 encoded Network Element Name+</SIG_CWI_NE_NAME>. This is followed by the URL-encoded XML request string. The encoded XML request ends with the close tag </SIG_CWI_SEND_XML>. The encoded XML request is provided below for further reference:

<SIG_CWI_SEND_XML><SIG_CWI_NE_NAME>craft-gsr-2</SIG_CWI_NE_NAME><REQUEST>%3c%3fxml
%20version%3d%271.0%27%20encoding%3d%22UTF-8%22%3f%3e%0a
%20%20%3cRequest%3e%0a
%20%20%20%3cGet%20xmlns%3axsi%3d%22http%3a%2f%2fwww.w3.org
%2f2001%2fXMLSchema-instance%22%3e%0a
%20%20%20%20%3cOperational%3e%0a
%20%20%20%20%20%20%3cInterfaceProperties%20%2f%3e%0a
%20%20%20%20%3c%2fOperational%3e%0a
%20%20%20%3c%2fGet%3e%0a
20%20%3c%2fRequest%3e%0a
</REQUEST></SIG_CWI_SEND_XML>

At 910, network management system 108 decodes the encoded XML request and forwards the decoded XML request to network element 112, for which the XML request is sent by user script 310. Further, network management system 108 receives a response from network element 112 regarding the XML request. Thereafter, network management system 108 encodes the XML response according to the data-encoding mechanism and forwards the coded XML response to user script 310. According to the data-encoding mechanism, the XML response is encoded in a single line. The coded XML response starts with the open tag <SIG_CWI_SEND_XML>. Further, the name of network element 112 sending the XML response is enclosed between <SIG_CWI_NE_NAME> and </SIG_CWI_NE_NAME>. This is followed by URL-encoded XML response enclosed between <RESPONSE> and </RESPONSE>. The encoded XML response ends with the close tag </SIG_CWI_SEND_XML>.

At 912, user script 310 sends a CLI request to network element 112 through network management system 108 that acts as a 'pass-through'. The CLI request from user script 310 is encoded according to the data-encoding mechanism and is sent to network management system 108 in a single line. The coded CLI request starts with the open tag <SIG_CWI_SEND_CLI>. This is followed by <SIG_CWI_NE_NAME>+URL-encoded Network Element Name+</SIG_CWI_NE_NAME>. This is followed by URL-encoded command enclosed between <REQUEST> and </REQUEST>. The coded CLI request ends with the close tag </SIG_CWI_SEND_CLI>.

At 914, network management system 108 decodes the CLI coded request and forwards the decoded CLI request to network element 112, for which the CLI request is sent by user script 310. Further, network management system 108 receives a response from network element 112 regarding the CLI request. Thereafter, network management system 108 encodes the CLI response according to the data-encoding mechanism and forwards the coded CLI response to user script 310. According to the data-encoding mechanism, the CLI response is encoded in a single line. The coded CLI response starts with the open tag <SIG_CWI_SEND_CLI>. Further, the name of network element 112 sending the CLI response is enclosed between <SIG_CWI_NE_NAME> and </SIG_CWI_NE_NAME>. This is followed by URL-encoded CLI response enclosed between <RESPONSE> and </RESPONSE>. The encoded CLI response ends with the close tag </SIG_CWI_SEND_CLI>.

At 916, user script 310 returns the record data to network management system 108. The record data is encoded according to the data-encoding mechanism. The record data is encoded in a single line. The coded record data starts with the open tag <SIG_CWI_DATA>. Further, the coded record data has a first row for column names, each column data is URL-encoded, columns are separated by a '/' and rows are separated by '$'. The coded record data ends with the close tag </SIG_CWI_DATA>.

At 918, network management system 108 sends an acknowledgement or non-acknowledgement for the coded record data to user script 310. If network management system 108 receives the coded record data without any error, then the acknowledgement is sent to user script 310. The acknowledgement or ACK is in one line and is sent as <SIG_CWI_ACK></SIG_CWI_ACK>. In case there is any error, then network management system 108 sends a non-acknowledgement or NACK as <SIG_CWI_NACK>+URL-encoded error message+</SIG_CWI_NACK>.

At 920, network management system 108 decodes the coded record data and then displays the output to network administrator 102.

The steps explained above are summarized in the form of a table and presented as below:

| Step | Description | Data encoding |
|---|---|---|
| 1. | Network management system 108 invokes user script 310. | |
| 2. | Network management system 108 sends coded record data to user script 310 through Stdin. | Table header, rows and columns are converted to string before sent to the script. The data encoding steps are: Each table cell including the header is transferred to a string and then URL-encoded. All data strings are URL-encoded. This means that all non-alphanumeric characters are converted to a hexadecimal number and prefixed with '%'. For instance, a forward slash '/' is converted to '%2F', and space is converted to '+'. In each row, every URL-encoded cell are joined by the '/' character. All rows are joined by the '$' character to form a single line. The final string sent to user script 310 is in a single line. It starts with a header indicating start of data: <SIG_CWI_DATA>, followed by the encoded string and the close tag </SIG_CWI_DATA>, and terminates with a newline character '\n'. Network management system 108 table data is provided. After encoding, the data in this table is sent to user script 310 as below: <SIG_CWI_DATA>Name$Line+State/MgmtEth0%2F0%2FCPU0%2F0$UP/Null0$UP/GigabitEthernet0%2F1%2F0%2F0$UP/GigabitEthernet0%2F1%2F0%2F1$ADMINDOWN/GigabitEthernet0%2F1%2F0%2F2$ADMINDOWN</SIG_CWI_DATA> |
| 3. | User script 310 reads, parses and processes the coded record data. | |
| 4. | User script 310 sends an XML request to network element 112 through network management system 108. | The XML request from user script 310 is encoded and sent to network management system 108 in a single line. To encode this example, XML request:<br><?xml version='1.0' encoding="UTF-8"?><br>  <Request><br>    <Get xmlns:xsi="http://www.w3.org/2001/XMLSchema-instance"><br>      <Operational><br>        <InterfaceProperties /><br>      </Operational><br>    </Get><br>  </Request><br>This XML request is encoded as below:<br>The line starts with <SIG_CWI_SEND_XML><br>Next part denotes the name of network element 112 to which this XML request is addressed. The format of this part is: |

-continued

| Step | Description | Data encoding |
|---|---|---|
| | | <SIG_CWI_NE_NAME>+Base64 encoded NEName+</SIG_CWI_NE_NAME><br>Followed with the URL-encoded XML request string.<br>End the line with </SIG_CWI_SEND_XML><br>The coded result is below. It is in a single line.<br><SIG_CWI_SEND_XML><SIG_CWI_NE_NAME>craft-gsr-2</SIG_CWI_NE_NAME><REQUEST>%3c%3fxml%20versio n%3d%271.0%27%20encoding%3d%22UTF-8%22%3f%3e%0a<br>%20%20%3cRequest%3e%0a<br>%20%20%20%3cGet%20xmlns%3axsi%3d%22http%3a%2f%2 fwww.w3.org<br>%2f2001%2fXMLSchema-instance%22%3e%0a<br>%20%20%20%20%3cOperational%3e%0a<br>%20%20%20%20%20%20%3cInterfaceProperties%20%2f%3e %0a<br>%20%20%20%20%3c%2fOperational%3e%0a<br>%20%20%20%3c%2fGet%3e%0a<br>%20%20%3c%2fRequest%3e%0a<br></REQUEST></SIG_CWI_SEND_XML> |
| 5. | Network management system 108 decodes the coded XML request and forwards it to network element 112 and obtains an XML response from network element 112, encodes and sends back the XML response to user script 310. | The XML response sent to user script 310 is coded as below:<br>Single line<br>Start with <SIG_CWI_SEND_XML> and enclosed network element 112 name between<br><SIG_CWI_NE_NAME> and </SIG_CWI_NE_NAME><br>Followed by URL-encoded XML response enclosed between <RESPONSE> and </RESPONSE><br>End with </SIG_CWI_SEND_XML> |
| 6. | User script 310 sends a CLI request to network element 112 through network management system 108. | The CLI request from user script 310 is encoded and sent to network management system 108 in a single line. Similar to encoding of the XML request:<br>The line starts with <SIG_CWI_SEND_CLI><br>Followed by <SIG_CWI_NE_NAME> + URL-encoded NEName + </SIG_CWI_NE_NAME><br>URL-encoded command between <REQUEST> and </REQUEST><br>End with </SIG_CWI_SEND_CLI> |
| 7. | Network management system 108 decodes the coded CLI request and forwards it to network element 112; then obtains a CLI response from network element 112, encodes and sends back the CLI response to user script 310. | Similar to XML response, the CLI response is encoded as below:<br>Single line<br>Starts with <SIG_CWI_SEND_CLI><br>Followed by network element 112 name enclosed between <SIG_CWI_NE_NAME> and </SIG_CWI_NE_NAME><br>Followed by URL-encoded CLI output enclosed between <RESPONSE> and </RESPONSE><br>Ends with </SIG_CWI_SEND_CLI> |
| 8. | User script 310 returns the record data to network management system 108. | The record data is encoded in a single line:<br>Starts with <SIG_CWI_DATA><br>The record data is encoded in a similar manner as in step 2: first row for column names, each column data is URL-encoded, separate columns with '/' and separate rows with '$'<br>Ends with </SIG_CWI_DATA> |
| 9. | Network management system 108 sends ACK to user script 310 when the record data is received, or NACK if there is any error. | The acknowledgement or non-acknowledgement data is in a single line.<br>If it's ACK, this line is<br><SIG_CWI_ACK></SIG_CWI_ACK><br>If it's NACK, this line is <SIG_CWI_NACK> + URL-encoded error message + </SIG_CWI_NACK> |
| 10. | Network management system 108 displays the processed record data in tabular form. | |

Alternatively, user script 310 may not return any record data to network management system 108 at step 8 in the table given above. In this case, it is sufficient to send an end signal when the communication is complete from user script 310. While using Perl language as the programming language for communicating with user script 310, the end signal is represented as CWItalk::end script ( ) instead of using CWItalk::send result ($).

On launching or refreshing customized application 308, CWI network management system invokes user script 310. CWI network management system invokes user script 310 on the basis of the open and close tags. When user script 310 is invoked for the first time, network management system 108 provides the record data via the Stdin. When using the Perl programming language, reading the record data is accomplished by using CWItalk::read_data_records( ) method. An example of this operation is provided below:

```
# First interaction to be done with CWI read the data.
    $parsed=CWItalk::read_data_records( );
    # A traditional return mechanism in Perl is to use an array of two
    # values. The first entry being 0 if successful and the second being
    # either the actual data or an error message.
    # Here we are getting back the data which was passed to us by CWI
    if($parsed->[0])
    {
    my $msg=$parsed->[1];
    my_log($fh, "ERROR: $msg");
    CWItalk::end script( );
    exit 1;
    }
```

During the communication of network management system 108 with user script 310, when user script 310 sends the XML or CLI request to network management system 108, information regarding network element 112, for which the XML or CLI request is sent, is also provided. In addition, to use the XML request, an understanding of an IOS-XR XML schema is required. IOS-XR refers to next-generation operating system commercially available from Cisco Systems, the parent corporation of the present assignee, for Cisco's new carrier class routers such as its flagship CRS-1 router. The IOS-XR XML schema is a set of rules and information regarding XML and XML requests. For CLI requests, an understanding of the CLI commands is required. An exemplary CLI command in Perl programming language is provided below:

```
# Test sending CLI request to router.
    $cmd="admin show install";
    $rc=CWItalk::send_cli_request($neName, $cmd);
    if($rc->[0])
    {
    my $msg=$rc->[1];
    my_log($fh, "error: send_cli_request: $msg");
    }
    else
    {
    my $msg=$rc->[1];
    my_log($fh, "good: send_cli_request: response for \"$cmd\"");
    my_log($fh, $msg);
}
```

In order for network management system 108 to determine if user script 310 is to be run, the following condition must be true. The condition is: For each property name defined in the output properties of user script 310, there must be at least one property, which matches an existing property with the 'visible attribute' set to true.

During the launch and execution of user script 310, if an error occurs, it is presented on the standard error stream of the process. This error is presented to network administrator 102 in the form of error window 702 on network management system 108. Error window 702 provides information regarding the error. For example, if AAA fails while sending a request to network element 112, it is a type of an error. Additionally, network management system 108 saves the information in error logs, which are used by network administrator 102 for fixing the error. The information regarding the error includes information regarding network element 112, with which network management system 108 communicates when an error occurs. Further, the information includes information regarding the type of connection used for communicating with network element 112. In addition, the information includes information regarding user script 310 that sends requests to network management system 108 for network element 112. Additionally, the request and the response captured so far is also included in the error log.

Figure 10:
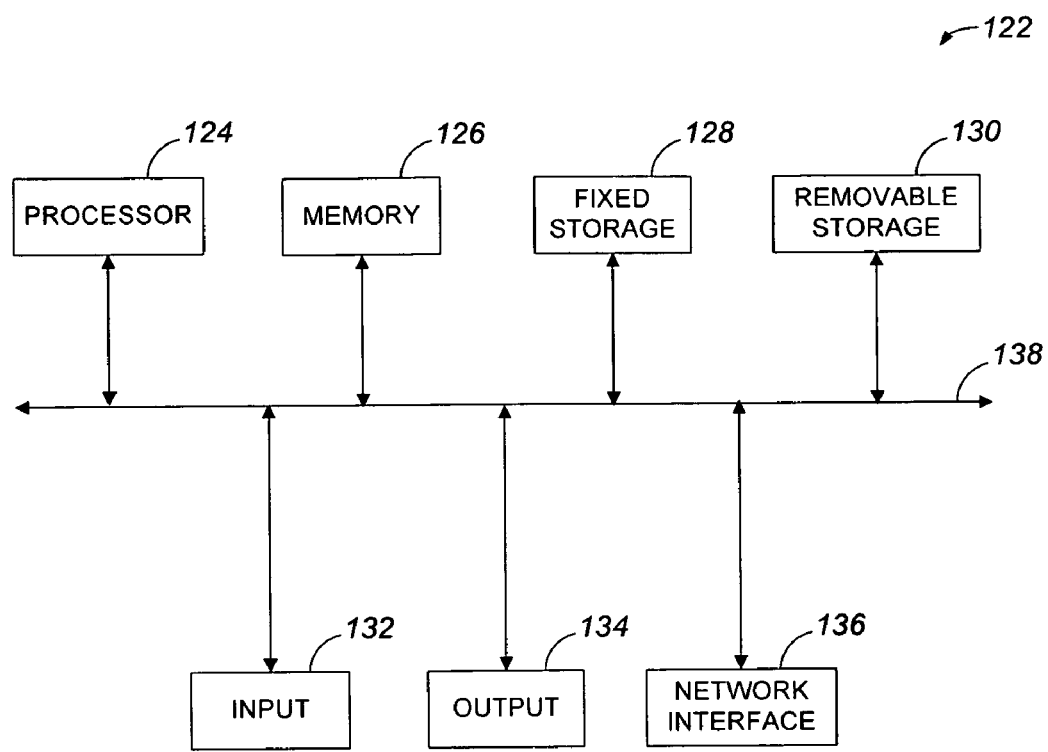
FIG. 10 shows a block diagram of components that may be present in one or more computer systems 122 that implement embodiments of the present invention

FIG. 10 shows a block diagram of components that may be present in one or more of the computer systems 122, such as workstation 110, a server or network element, that implement embodiments of the present invention. Specifically, a computer system 122 includes a processor 124 that executes instructions from computer programs, including operating systems. Processor 124 may be utilized to allow network management applications and user scripts, for example, to execute. Although processor 124 typically has memory caches, processor 124 may utilize memory 126, which may store instructions or computer code and data to implement embodiments of the present invention.

The processor may be a dual core or multicore processor, where there are multiple processor cores on a single integrated circuit. The system may also be part of a distributed computing environment. In a distributed computing environment, individual computing systems are connected to a network and are available to lend computing resources to another system in the network as needed.

A fixed storage 128 may store computer programs and data. Fixed storage 128 is typically persistent, and provides more storage than memory 126. One example of a typical fixed storage 128 for a network management application comprises multiple hard drives, although it should be understood that fixed storage 128 maybe be any suitable component. A removable storage 130 provides mobility to computer programs and/or data that are stored thereon. Removable storage 130 may include, but is not limited to, mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

Memory 126, fixed storage 128 and removable storage 130 provide examples of computer-readable storage media that may be utilized to store and retrieve computer programs incorporating computer codes or code devices that implement the invention, data for use with the invention, and the like. Additionally, a data signal embodied in a carrier wave, e.g., in a network such as the Internet or an Intranet, may also be a computer-readable storage medium. An input device 132 allows a user to interface with computer system 122. Input device 132 may be a keyboard, a mouse, buttons, dials, or any other suitable input mechanism. An output device 134 generally allows system 122 to provide output to the user. Output device 134 may include, but is not limited to, devices such as monitors, display screens, LEDs, printers, or substantially any other output mechanism.

Additional peripherals may be connected to the system through a network interface 136 or other interface such as serial, parallel, or universal serial bus (USB) interfaces.

Network interface 136 typically allows system 122 to interface with a network to which it is connected. The system bus architecture of computer system 122 is represented by arrows 138. The components shown in FIG. 10 may be found in many computer systems. However, components may be added, deleted, and combined without departing from the spirit or the scope of the present invention. For example, fixed storage 128 may be a file server that is accessed through a network connection. Thus, FIG. 10 is for illustration purposes and is not limiting.

In one embodiment, an IT administrator utilizes computer system 122 to initiate a change or addition to a network management application by modifying the definition file or user defined scripts. Thereafter, the network management system uses the definition file to collects responsive information on the status and system attributes of one or more network elements. This information is then used by a specific application and may be displayed for the administrator on the output device 134.

An embodiment of the present invention provides a method for customizing a network management application in a network. The method comprises customizing, at run time, a user script for customizing the network management application; and executing, at run time, the customized network management application.

An embodiment of the present invention provides a method for customizing a network management application in a network. The method comprises customizing, at run time, a user script for customizing the network management application; executing, at run time, the customized network management application; and obtaining a user-customized output for managing the network.

An embodiment of the present invention provides an application-building tool for customizing a network management application. The application-building tool comprises means for providing a user script for customizing the network management application; and a text editor for customizing the user script for customizing the network management application at run time.

An embodiment of the present invention provides a machine-readable medium including instructions executable by a processor. The machine-readable medium comprises one or more instructions for customizing, at run time, a user script for customizing a network management application; and one or more instructions for executing, at run time, the customized network management application.

An embodiment of the present invention provides an apparatus for customizing a network management application in a network. The apparatus comprises a processor for executing instructions; and a machine-readable medium including instructions executable by the processor. The machine-readable medium comprises one or more instructions for customizing, at run time, a user script for customizing the network management application; and one or more instructions for executing, at run time, the customized network management application.

An embodiment of the present invention enables the network administrator to create and modify network management applications at run-time. This creation or modification is achieved by simply editing a user-defined application file without having to make any code changes. This differs significantly from other known network management applications, which typically require a new implementation of a given application for each different set of customers requirements. Combining this capability with the user defined scripting framework, provides an even more powerful and flexible tool for the network administrator.

An embodiment of the present invention provides an application-building tool that allows a network administrator to customize an application provided by a network management system. The network administrator, such as an administrator, customizes the application to satisfy his own specific requirement. The network administrator customizes the application without requesting the developers of the application to customize the application. This avoids a long delivery cycle of a customized application. Further, the network administrators do not require training from the developers on how to use the application.

An embodiment of the present invention facilitates the network administrator to customize the application at run time.

An embodiment of the present invention facilitates the developers by avoiding a need to monitor the network administrators and satisfying their specific requirements.

An embodiment of the present invention provides simplified delivery of application updates to the network administrators from the developers by sending a single file to the network administrators by email, download or other electronic delivery methods.

An embodiment of the present invention facilitates the network administrators to modify presentation of data related to network elements in a network.

An embodiment of the present invention allows easy deployment of applications through a single application definition file.

Although the invention has been discussed with respect to specific embodiments thereof, these embodiments are merely illustrative, and not restrictive, of the present invention. For example, a 'method for run-time customization of network management applications' can include any type of analysis, manual or automatic, to anticipate the needs of obviating redundant actions.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

Any suitable programming language can be used to implement the routines of an embodiment of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments of the present invention, multiple steps shown as sequential in this specification can be performed at the same time. The sequence of operations described herein can be interrupted, suspended, or otherwise controlled by another process. The routines can operate in a networking environment or as stand-alone routines occupying all, or a substantial part, of the system processing.

In the description herein for the embodiments of the present invention, numerous specific details are provided, such as examples of elements and/or methods, to provide a thorough understanding of the embodiments of the present invention. One skilled in the relevant art will recognize, however, that an embodiment of the present invention can be practiced without one or more of the specific details, or with other apparatus, systems, assemblies, methods, components, parts, and/or the like. In other instances, well-known operations are not specifically shown or described in detail to avoid obscuring aspects of the embodiments of the present invention.

A 'computer program' for purposes of the embodiments of the present invention may include any processor-containing device, such as a mainframe computer, personal computer, laptop, notebook, microcomputer, server, personal data manager (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a pre-determined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of the embodiments of the present invention may be any medium that can contain, store, communicate, propagate, or transport the computer program for use by or in connection with the instruction execution system apparatus, system or device. The computer readable medium can be, by way of example only but not by limitation, an electronic, magnetic, optical, electromagnetic, infrared, or semiconductor system, apparatus, system, device, propagation medium, or computer memory.

Reference throughout this specification to "one embodiment", "an embodiment", or "a specific embodiment" means that a particular feature, structure, or characteristic described in connection with the embodiment is included in at least one embodiment of an embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the present invention to the precise forms disclosed herein. While specific embodiments of, and examples for, the present invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of the embodiments of the present invention will be employed without a corresponding use of other features without departing from the scope and spirit of the present invention as set forth. Therefore, many modifications may be made to adapt a particular situation or material to the essential scope and spirit of the present invention. It is intended that the present invention not be limited to the particular terms used in following claims and/or to the particular embodiment disclosed as the best mode contemplated for carrying out this present invention, but that the present invention will include any and all embodiments and equivalents falling within the scope of the appended claims.

What is claimed is:

1. In a network defined by a plurality of network elements, a method comprising:
   enabling a network management master application to interface with a first constituent application and a second constituent application;
   accessing a customized definition file for the first constituent application;

associating, during execution of the network management master application, the customized definition file with the first constituent application;

executing the first constituent application that is associated with the customized definition file, within the network management master application;

accessing, after initiating execution of and as a consequence of executing the first constituent application, a user script related to the customized definition file;

executing the user script in a process independent of the network management master application and the first constituent application;

receiving, as a result of executing the user script, an updated management record for the first constituent application; and configuring the first constituent application to present the updated management record to a user.

2. The method of claim 1 further comprising obtaining a user-customized output on executing the network management application within a framework of the network management master application.

3. The method of claim 1, wherein providing the customized definition file further comprises providing a user script.

4. The method of claim 3, wherein providing the user script further comprises creating the user script in a text editor.

5. The method of claim 3, wherein providing the user script comprises creating a stand-alone script.

6. The method of claim 3, wherein providing the user script comprises selecting a set of pre-defined attributes associated with at least one network element.

7. The method of claim 3, wherein providing the user script further comprises associating the user script with the definition file.

8. The method of claim 7, wherein the definition file is in the Extensible Markup Language (XML) format.

9. The method of claim 7, wherein the definition file defines location and attributes of the user script.

10. The method of claim 1, wherein executing the network management application within a framework of the network management master application comprises communicating data between the user script and the network elements.

11. In a network defined by a plurality of network elements, a method comprising:

enabling a network management master application to interface with a first constituent application and a second constituent application;

accessing a customized definition file for the first constituent application, the customized definition file providing information associated with a user script related to the first constituent application;

associating, during execution of the network management application, the customized definition file with the first constituent application;

executing the first constituent application that is associated with the customized definition file, within the network management master application;

obtaining, using the first constituent application, data for managing the network;

accessing, based on obtaining the data for managing the network, the user script;

processing, using the user script and within the network management master application, the data for managing the network; and responsive to processing using the user script, obtaining a customized output from the network management application.

12. An application-building tool for customizing a network management application, the application-building tool being a computer program on a non-transitory machine-readable medium and comprising:

one or more instructions that when executed by a processor cause the processor to perform operations including:

enabling a network management master application to interface with a first constituent application and a second constituent application;

accessing a customized definition file for the first constituent application, the customized definition file providing information associated with a user script related to the first constituent application;

associating, during execution of the network management application, the customized definition file with the first constituent application;

executing the first constituent application that is associated with the customized definition file, within the network management master application;

obtaining, using the first constituent application, data for managing the network;

accessing, based on obtaining the data for managing the network, the user script;

processing, using the user script and within the network management master application, the data for managing the network; and responsive to processing using the user script, obtaining a customized output from the network management application; and a text editor for customizing the definition file and the user script at run time.

13. The application-building tool of claim 12, wherein the network management application is at least one of: rack monitoring application or card environment monitoring application or sensor environment monitoring application or health monitoring application or performance system monitoring application or performance process monitoring application or performance interface monitoring application.

14. The application-building tool of claim 13, wherein the text editor is at least one of Notepad or Wordpad or command line editor.

15. A non-transitory machine-readable medium including instructions executable by a processor, the instructions when executed by a processor cause the processor to perform operations including:

enabling a network management master application to interface with a first constituent application and a second constituent application;

accessing a customized definition file for the first constituent application, the customized definition file providing information associated with a user script related to the first constituent application;

associating, during execution of the network management application, the customized definition file with the first constituent application;

executing the first constituent application that is associated with the customized definition file, within the network management master application;

obtaining, using the first constituent application, data for managing the network;

accessing, based on obtaining the data for managing the network the user script; and processing, using the user script and within the network management master application, the data for managing the network.

16. The machine-readable medium of claim 15 further comprising one or more instructions that when executed by the processor cause the processor to perform operations including obtaining a user-customized output on executing the network management application.

17. The machine-readable medium of claim 15, further comprising one or more instructions that when executed by the processor cause the processor to perform operations including providing a definition file.

18. The machine-readable medium of claim 17, further comprising one or more instructions that when executed by the processor cause the processor to perform operations including creating a stand-alone user script.

19. The machine-readable medium of claim 17, further comprising one or more instructions that when executed by the processor cause the processor to perform operations including selecting a set of pre-defined attributes associated with at least one network element.

20. The machine-readable medium of claim 17, further comprising one or more instructions that when executed by the processor cause the processor to perform operations including associating the user script with the definition file.

21. An apparatus for customizing a network management application in a network, the apparatus comprising:
  a processor for executing instructions; and
  a non-transitory machine-readable medium including instructions executable by the processor, the non-transitory machine-readable medium comprising:
    one or more instructions for enabling a network management system to interface with a first constituent application and a second constituent application;
    one or more instructions for accessing a customized definition file for the first constituent application;
    one or more instructions for associating, during execution of the network management master application, the customized definition file with the first constituent application;
    one or more instructions for executing the first constituent application that is associated with the customized definition file;
    one or more instructions for accessing, after initiating execution of and as a consequence of executing the first constituent application, a user script related to the customized definition file;
    one or more instructions for executing the user script in a process independent of the network management master application and the first constituent application;
    one or more instructions for receiving, as a result of executing the user script, an updated management record for the first constituent application; and
    one or more instructions for configuring the first constituent application to present the updated management record to a user.

* * * * *

UNITED STATES PATENT AND TRADEMARK OFFICE
CERTIFICATE OF CORRECTION

| | | |
|---|---|---|
| PATENT NO. | : 8,065,660 B1 | Page 1 of 1 |
| APPLICATION NO. | : 11/505154 | |
| DATED | : November 22, 2011 | |
| INVENTOR(S) | : David Anthony Tanner et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,283 days.

Signed and Sealed this

Seventeenth Day of April, 2012

David J. Kappos
*Director of the United States Patent and Trademark Office*